W. D. GEMMILL.
TEMPORARY CONNECTION FOR METAL STRUCTURES.
APPLICATION FILED JUNE 3, 1916.
1,232,527.
Patented July 10, 1917.
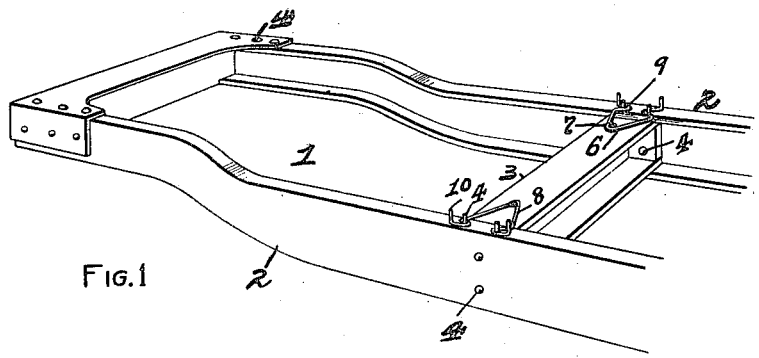
Fig.1
Fig.2
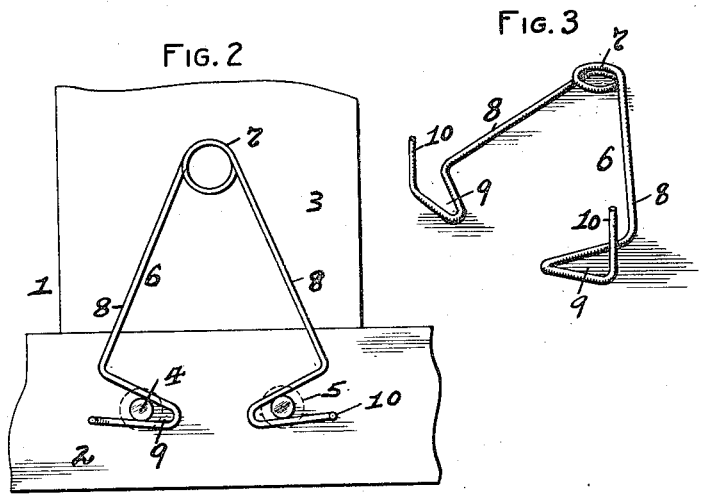
Fig.3
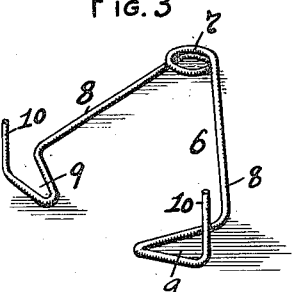
Fig.4
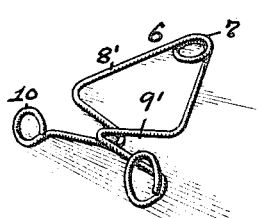
Fig.5
WITNESSES
L. M. Collins
J. M. Geoghegan
INVENTOR
Worthy David Gemmill,
By J. N. Cooke,
Attorney.

UNITED STATES PATENT OFFICE.

WORTHY DAVID GEMMILL, OF CLEVELAND, OHIO, ASSIGNOR TO PARISH & BINGHAM COMPANY, OF CLEVELAND, OHIO, A CORPORATION OF OHIO.

TEMPORARY CONNECTION FOR METAL STRUCTURES.

1,232,527.     Specification of Letters Patent.     Patented July 10, 1917.

Application filed June 3, 1916. Serial No. 101,540.

*To all whom it may concern:*

Be it known that I, WORTHY DAVID GEMMILL, a citizen of the United States, and resident of Cleveland, in the county of Cuyahoga and State of Ohio, have invented a new and useful Improvement in Temporary Connections for Metal Structures; and I do hereby declare the following to be a full, clear, and exact description thereof.

My invention relates to connecting parts of structures, and particularly metal structures for temporary handling prior to the final or rigid connecting of such parts.

In the manufacture of metal structures, such as automobile frames and similar devices, it has been customary to assemble the various parts of the frame together and temporarily connect these parts by means of screw clamps, or bolts and nuts, and in the case of nuts being used they are of the ordinary or wing type. In the riveting of such frame it has been necessary to unscrew the clamps or unscrew the nuts to remove such nuts and bolts, and then insert a rivet in the hole previously occupied by the bolts and then the head of such rivet is riveted down on the parts to connect the same together.

The object of my invention is to dispense with the use of these clamps, bolts and nuts, and to use the connecting rivets with other means for detachably holding the parts of the frame together temporarily, and which will enable such connecting means to be removed at the proper time to permit the rivets to be headed in the usual manner.

To these ends my invention consists in the novel method, rivet holding means, and combination of parts, as hereinafter more specifically set forth and particularly pointed out in the claims.

To enable others skilled in the art to which my invention appertains to practice, construct and use my improved method, means and combination of parts for connecting parts of structures, I will describe the same more fully, referring to the accompanying drawing in which:—

Figure 1 is a perspective view showing one end of an automobile frame with the parts composing the same assembled and temporarily held together in accordance with my invention. Fig. 2 is an enlarged top plan view showing a portion of such frame. Fig. 3 is a perspective view of the rivet holding device shown in Figs. 1 and 2. Figs. 4 and 5 are views of other forms of the device for use with a single rivet.

Like symbols of reference herein indicate like parts in each of the figures of the drawing.

As illustrated in the drawing my invention is shown in connection with an automobile frame 1, which is provided with the usual longitudinal side rails or members 2 and the cross or transverse members 3, such members being punched in the usual manner to form the usual holes to receive the usual rivets, through which the members are to be permanently connected together. These rivets are shown at 4, and when the members 2 and 3 are assembled in position, the holes formed by punching register with each other in such members for each rivet. The head 5 on one end of each rivet comes against the member through which the rivet is passed, and the other or opposite unheaded end on such rivet projects beyond the plurality of members to be united. When two of the rivets are thus placed in position, they, with the members 2 and 3, are held together in any suitable manner, such as by the hands of the operator, and then the rivet holding device is connected to the unheaded projecting ends on such rivets as hereinafter described.

The rivet holding device is shown at 6, and is preferably made from a single piece of spring steel, such as wire, which is bent centrally upon itself to form the coil or ring 7 at one end, and having a U-shaped body portion *a* extending therefrom. After being so coiled the wire is bent to form the arms 8 in such body and extending outwardly from the coil 7, and then such wire is bent inwardly to form the triangular-shaped seating portions 9 at the other end of the device for engaging the projected ends of the rivets. The wire is further bent at the outer extremities of the portions 8 to form the handle or gripping portions 10, while such gripping portions enable the arms 8 to be grasped for expanding or contacting, to permit the angular seating portions 9 to fit around the rivets, and be forced down along such rivets so as to rest upon or against the adjacent members together with the remaining portions of such device.

It will be obvious that when the members, rivets and holding device are thus in position, the rivets will be held in place for riveting and such rivets, as well as the other members of the structure will be held firmly together, so that the assembled structure can be moved about as required, and also to the riveting machine for riveting the said rivets in their permanent positions as hereinafter described. As each rivet is provided with a rivet holding device for holding all the parts in the assembled structure together, the parts of the structure will be temporarily but firmly held together and in place, so that such structure or such parts of the same in course of assemblage can be moved to the usual riveting machine where the projecting ends of the rivets 4 are headed, and the rivet holding device 6 being readily removable by grasping the gripping portions 8 and drawing the same toward each other will free the portion 9 from the rivets, thereby enabling such device to be lifted off the rivets just before the heading punch descends.

In Fig. 4, is shown another form of my improved rivet holding device for use in holding a single rivet, and in this case, the portions 9' are brought toward each other in order to overlap and form the rivet receiving portion between the ends of the same. This form is opened to fit over the projecting end of the rivet by pressing inward on the gripping portions 8' which will spring open said portions 9' sufficiently to fit over said end, and upon releasing such pressure on the portions 8' the portions 9' will engage such rivet end. The portions 9' are released from engagement with the rivet ends by again pressing on the portions 8' to open up such portions 9' to free the same from such end.

In Fig. 5, the single rivet holding device is shown, in which the wire is bent centrally upon itself to form the ring or circle 7', and is of such size as to firmly grasp the projecting end of the rivet. After the circle 7' is so formed, the wire is crossed at 7", with the ends curved out in slightly diverging directions and extended upward to form the gripping portions 8". Upon pressing inward on the portions 8", the circle is enlarged to enable placing around the rivet and upon the pressure being released, the circle engages the rivet. This device is removed by pressing inward on the portions 8" which will open up the circle to permit the device being taken off the rivet.

Various other modifications and changes in the form of the rivet holding means, method employed, combination of parts, and application of such means and method, may be resorted to without departing from the spirit of the invention, as defined in the appended claims.

It will thus be seen that in the employment of this invention, a great deal of time and labor will be saved, which was formerly consumed in applying clamps or bolts and nuts to hold the various parts of metal structure in their positions for proper assemblage to enable handling and final connecting of the same.

It will also be seen that the invention will enable a rigid and firm temporary connection to be made of metal parts, so that the proper assemblage can be carried out, and by thus doing away with the use of clamps or bolts and nuts, will permit the rivets used for permanently connecting the parts together to be utilized for the temporary connection.

It will further be seen that the various parts of the metal structure can be assembled and united in a rapid and methodical manner, as each rivet will be in its proper position and held for riveting at all times, while the rivet holding means can be readily attached to and detached from the rivets at all times and will not interfere in any way with the riveting operation.

What I claim as my invention and desire to secure by Letters Patent is:—

1. A resilient member for temporarily retaining rivets in structures comprising a substantially U-shaped body, the closed portion of said body comprising a resilient portion, the side portions of said U-shaped body having their free ends bent to form recesses for the reception of rivets, and upwardly-extending portions adapted to be engaged by the operator.

2. A member for temporarily retaining rivets in structures comprising a substantially U-shaped body, a resilient portion formed on said body integral therewith, the free ends of the sides of said U-shaped body portion being bent to form recesses extending inwardly of said body portion, said recesses being substantially triangular in shape, and upwardly-extending finger engaging portions formed on said body.

3. A device of the class described comprising a substantially U-shaped body portion, a resilient portion formed at the closed end of said body portion, a portion of said device being adapted to engage and hold a rivet, and said body portion having its free ends bent upwardly forming finger engaging portions adapted to be engaged by the operator to operate said device.

In testimony whereof, I, the said WORTHY DAVID GEMMILL, have hereunto set my hand.

WORTHY DAVID GEMMILL.

Witnesses:
W. C. NEWMAN,
J. N. COOKE.